May 30, 1933. H. C. LASSEN ET AL 1,912,209
METHOD AND APPARATUS FOR TREATING PLANTS
Filed July 9, 1930
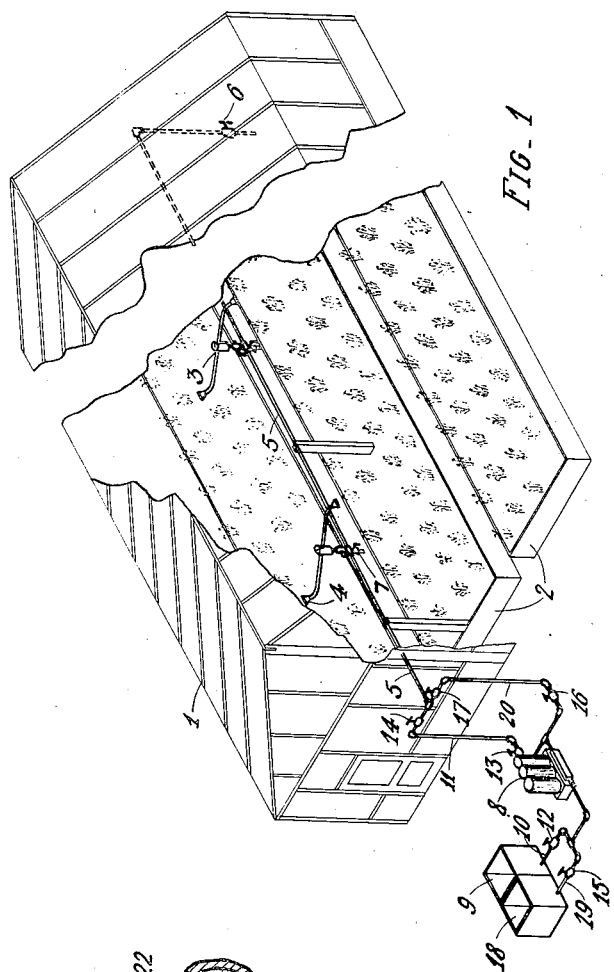
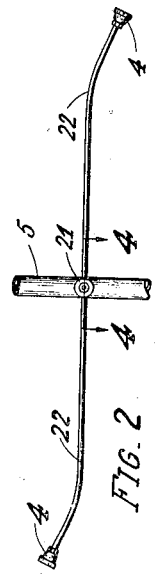
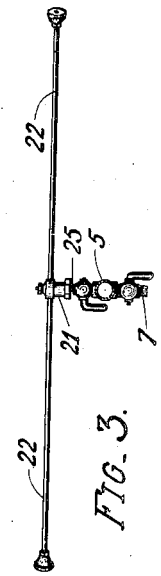
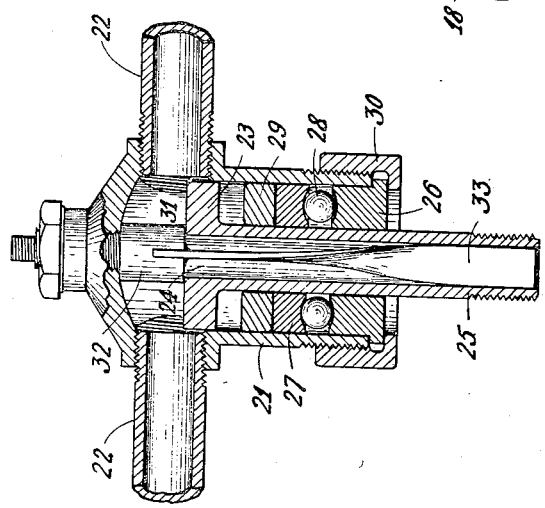
INVENTOR.
Harry C. Lassen.
BY Henry Dahl.
ATTORNEYS.

Patented May 30, 1933

1,912,209

UNITED STATES PATENT OFFICE

HARRY C. LASSEN AND HENRY DAHL, OF SAN JOSE, CALIFORNIA, ASSIGNORS TO FOOD MACHINERY CORPORATION, OF SAN JOSE, CALIFORNIA, A CORPORATION OF DELAWARE

METHOD AND APPARATUS FOR TREATING PLANTS

Application filed July 9, 1930. Serial No. 466,786.

This invention relates to the horticultural arts and altho it is capable of application to the cultivation and treatment of any kind of plants, it is especially useful in connection with the art of floriculture as practiced in greenhouses and the like.

The ravages of injurious pests, such as thrips, lice and fungus spores and the like, which attack and destroy plant life are the source of yearly losses of large proportions to florists and other greenhouse operators. In moderate weather the spread of these pests can be checked and the damage done by them kept within reasonable bounds by spraying the plants from time to time with suitable substances toxic to undesirable organisms such as nicotine solutions and the like which are very effective for this purpose. However, any increase in temperature serves to increase their activity and cause them to multiply more rapidly so that on hot days when the temperature in the greenhouses rises abnormally, immediate measures must be taken to destroy them or they cause a large amount of damage in the space of a few hours.

It is desirable to prevent the temperature from rising too high in the greenhouse, not only for protection against pests, but also because the heat causes unduly rapid evaporation of moisture from the plants with resultant injury to them. Attempts have been made to lower the temperature and supply the plants with the necessary moisture by means of sprinkling but it has been found that the temperature cannot be sufficiently lowered in this manner and the moisture is evaporated from the surfaces of the plants faster than they can absorb it from the earth. Moreover, particularly in the case of flowers, the streams of water falling upon the plants result in considerable damage to the foliage and blossoms by tearing away petals, and causing unsightly spots which render them unmarketable.

As above pointed out, the pests can be destroyed by spraying the plants with certain insecticides. One of the most successful sprays of this character is a solution of nicotine, but in spraying the plants with this solution, it is important that no drops be allowed to collect on the blossoms, as an unsightly spot would result. The solution must, therefore, be applied in the form of a very fine mist or fog. To accomplish this it has heretofore been the custom to provide a number of operators with hand spray pumps, and the operators begin at one end of the greenhouse and work toward the other end, keeping as near abreast of each other as practical, and spraying the plants as they go. This method is laborious, and expensive and is so slow that in cases of emergency, such as pointed out above, the pests may cause considerable damage before the spraying can be completed. Moreover, since the spray is poisonous to humans as well as thrips, the greenhouses cannot be entered for a considerable length of time after the spraying has been finished. To open up the greenhouse, and air it out would, of course, only allow another crop of thrips to enter, and such course is impractical for that reason.

We have discovered that the greenhouse temperature can be controlled without damage to the plants by discharging relatively small amounts of water into the air in the form of a very fine fog or mist containing sensible heat only. When this is done throughout the entire greenhouse, the temperature can be materially lowered very quickly. Moreover, the mist entirely envelopes the plants and deposits a thin film of moisture over the entire exposed surface of each plant, without forming any large drops. The plants are thus enabled to absorb moisture very rapidly, without danger of disfiguring any of the foliage or blossoms.

The water fog or mist containing sensible heat only can be discharged into the air immediately after the plants have been sprayed with solution so that the temperature is not only lowered but the air is quickly cleared of the poisonous vapors and within a very few minutes the greenhouses may be safely entered.

It is, therefore, one of the principal objects of this invention to provide a method of protecting plants in greenhouses and the like, from the destructive attacks of pests, which shall be highly efficient and require less time, labor and expense than methods heretofore known.

Another object is to provide a method of spraying plants in greenhouses and the like with substances toxic to undesirable organisms and quickly dissipating the noxious vapors whereby the greenhouses may be safely entered within a very short period after spraying.

It is also an object to provide a method of controlling the temperature in greenhouses and the like by means of water sprays which shall be highly efficient and which shall result in no injury to the plants or blossoms.

A further object is to provide a method of spraying water into greenhouses and the like which shall not only control the temperature therein but which shall rapidly supply moisture to the plants without injury to the foliage or blossoms.

Another object is to provide a method of controlling the temperature and watering the plants in greenhouses and the like by discharging water therein in the form of a fog or mist.

Still another object is to construct an apparatus adapted to carry out the above methods; and more particularly a spray system which shall be provided with a plurality of rotating nozzles adapted to discharge liquid in the form of a fog or mist.

A still further object is to provide a sprayer which shall be adapted to be rotated by the passage of liquid therethrough at low velocity and under high pressure, and which shall be adapted to free itself should it stick or jam.

Other objects and advantages will become apparent as the description proceeds in connection with the accompanying drawing in which:—

Fig. 1 is a perspective view of an apparatus embodying our invention as installed in a greenhouse.

Fig. 2 is a plan view of one of the rotating atomizers.

Fig. 3 is a side elevation of the atomizer shown in Fig. 2.

Fig. 4 is a section view taken through the hub of the atomizer along the line 4—4 of Fig. 2.

Referring to Fig. 1, 1 indicates a greenhouse in which are beds of plants 2. For spraying the plants there are installed a plurality of rotatable atomizers 3, provided with nozzles 4, which are supplied with liquid from the pipe 5, extending longitudinally of the greenhouse. The pipe 5 is mounted at an angle to the horizontal, so as to slope downwardly from its supply end, as illustrated, and is provided with a valve or faucet 6 at its opposite end which can be opened after the liquid supply to the pipe 5 is cut off whereby the pipe and atomizers are drained, and dripping from the nozzles 4 is prevented. Valve controlled outlets 7 are provided underneath each atomizer for the ready attachment of hose connections in cases where hand spraying or watering is found desirable. Altho for the purposes of description, we have illustrated the greenhouse as being provided with only one set of atomizers, it will be understood that a plurality of the pipes 5 may be installed whereby additional sets of atomizers may be operated if desired.

The pipe 5 is supplied with water or spray solution under high pressure by means of the pump 8 which draws water from the reservoir 9 through the water pipe 10 and delivers it through the pipe 11; or by closing the valves 12, 13, and 14 and opening the valves 15, 16, and 17 spray solution will be withdrawn from the reservoir 18 through the pipe 19 and delivered to the pipe 5 through the pipe 20. The strength of the spray solution can be varied if necessary by opening the valve 12 a sufficient distance to dilute the spray solution the desired amount before it is drawn into the pump. The water or spray solution is ordinarily at atmospheric temperature but at all events it is not heated to an extent sufficient to injure the plants nor above the latent heat of vaporization.

As heretofore pointed out, it is desirable that the liquids be introduced into the greenhouse in the form of a mist or fog and for the accomplishment of this purpose atomizers of special construction must be used, for example, such as disclosed in our Patent 1,876,250 issued September 6, 1932. In known types of rotary sprays, the liquid is fed to the nozzles through bent pipes so that the passage of the liquid around the bends imparts an impulse to the arms which causes them to rotate. In order to overcome the inertia of the parts and the friction in the rotating hub the velocity of the liquid passing the bends must be considerable, and usually amounts to from ten to twenty-five gallons per minute at a pressure of approximately 45 pounds per square inch. Under these conditions the liquid cannot be converted into a mist or fog but issues from the nozzles in the form of solid jets or large drops. Any attempt to increase the pressure results in increasing the frictional resistance of the hub to such an extent that rotation is prevented and the spray is thus rendered useless.

Atomizers constructed in accordance with our invention are adapted to atomize as low as one-half gallon of liquid per nozzle per minute under pressures as high as four hundred and fifty pounds per square inch, and under these conditions the passage of liquid therethrough will cause the parts to rotate so as to throw out a mist in all directions. Such an atomizer is illustrated in Figs. 2, 3, and 4 and comprises a hollow hub 21 from which protrude a plurality of outwardly extending pipes 22 carrying the nozzles 4. The pipes may be bent as illustrated in order to aid rotation, as will be understood.

Many spray solutions contain a certain amount of sediment or leave a crystalline residuum when evaporated and for this reason considerable difficulty may be experienced in starting the hub to rotate after a period of idleness. The heat encountered in greenhouses serves to evaporate the liquid from the interior of the hub, very rapidly leaving a deposit of sediment or crystals around the parts which causes them to stick and thus tends to prevent automatic starting when the pressure is again turned on. In order to overcome this difficulty, we have provided the hub 21 with a smooth bore for the reception of a plunger 23. The plunger has a central opening 24 to which is connected the hollow stem 25 which passes through the plug 26, and is screwed into the supply pipe 5. A ring 27 is provided with an annular groove which co-operates with a similar groove in the plug 26 to form a raceway for ball bearings 28, which serve to reduce friction and allow the hub to rotate easily when filled with liquid under high pressure. A packing ring 29 is provided to prevent leakage and the parts are held in operative position by means of the retaining ring 30. With this construction it will be seen that upon the admission of liquid under pressure to the chamber 31 the force exerted against the ceiling of the chamber will cause the hub 21 to rise with respect to the plunger 23, thus freeing the parts if they have become stuck and allowing the hub to be started rotating easily. When the admission of liquid to chamber 31 is cut off the hub 21 again settles down until the plug 32 rests upon the plunger 23.

It will also be noted that by reason of the above construction the packing ring 29 is automatically adjustable according to the pressure of the liquid. As the liquid pressure is increased, the packing is compressed so as to expand slightly and make a tighter fit, while upon reduction of the pressure whereby a looser fit is sufficient, the pressure on the packing is proportionately reduced thus allowing it to loosen slightly and offer less resistance to rotation of the hub 21.

In order to aid starting and co-operate with the bends in the pipes 22, in rotating the atomizer, a twisted metal strip 33, carried by the plug 32 is placed within the hollow stem 25, whereby the passage is divided into two spirally ascending passages. It will be seen that the reaction set up by the passage of liquid therethrough will tend to cause the atomizer to rotate.

It has been found that speeds of rotation of known types of rotating sprinklers which are from fifty to sixty revolutions per minute are entirely too high for the atomizer shown herein for the reason that at such speeds the mist is not thrown far enough away from the nozzle to effect the desired result. We have found that a speed of approximately twelve revolutions per minute is best for satisfactory operation of the atomizer and for discharging the mist to a proper distance. It will be understood that different speeds might be desirable under varying conditions of use and in such event the speed of rotation can be varied by adjusting the pitch of the spiral strip 33 or the angle of the bends in the pipes 22.

In operation, when it is desired to spray the plants with solution, the valves 6, 12, 13, and 14 are closed and valves 15, 16, and 17 are opened, whereupon the pump 8 is operated to fill the pipe 5 with spray solution under pressure. The solution is forced upwardly thru the spiral passages in the stems 25 into the chambers 31, thus simultaneously exerting a lifting and twisting force to the hubs 21, which are thereupon caused to rotate and a mist of the solution is ejected from each nozzle. With a suitable number of atomizers, it will be seen that the entire greenhouse is almost instantly filled with a floating mist or fog of solution. In this manner the pests may be destroyed in any size greenhouse within a period of about one minute as compared with periods of hours required by other methods.

When it is desired to cut off the spray solution, the valves 15, 16 and 17 are closed and the valve 6 is opened. In this manner the solution remaining in the atomizers and the pipe 5 may be drained off, thus preventing the nozzles from dripping and causing damage to the plants, and allowing the subsequent spraying of water without any preliminary spray of solution.

After the pipes are drained, the valve 6 is closed and the valves 12, 13, and 14 may be opened whereupon water is fed to the atomizers and a water mist is injected into the greenhouse thus quickly dissipating the vapors of spray solution. The water can be left on in order to reduce the greenhouse temperature to the desired point and supply the plants with moisture rapidly enough to prevent wilting.

It will now be seen that by the use of our novel method and apparatus we are enabled to spray the plants with a solution or spray containing substances toxic to undesirable organisms such as insecticides or fungicides, clear the air of noxious vapors, and lower the temperature of the greenhouse as well as accomplish other desirable results, with practically no labor and in a small fraction of the time heretofore required. Moreover, we have found that by the use of our invention we are enabled to save as much as one half the amount of spray solution heretofore necessary for destroying the undesirable organisms such as insectary pests. The control of plant diseases is similarly facilitated and made more economical. This represents a very material saving of expense.

Having now described our invention and in what manner the same may be used, what we claim as new and desire to secure by Letters Patent is:—

1. The method of cooling greenhouses and the like which comprises introducing an unheated non-poisonous liquid therein in the form of a fog-like mist.

2. The method of cooling greenhouses and the like which comprises creating a fog of an unheated non-poisonous liquid throughout the greenhouse.

3. The method of watering plants in greenhouses and the like which comprises enveloping them in unheated water mist of sufficient fineness to dampen the plants while avoiding accumulation of large drops of liquid thereon.

4. The method of treating plants in greenhouses and the like which comprises introducing a liquid insecticide into said greenhouse in the form of a floating mist, and thereafter dissipating the mist of insecticide by introducing water therein in the form of a floating mist.

5. The method of treating plants which comprises enveloping them in a floating mist of insecticide, and thereafter dissipating the mist of insecticide by enveloping them in an unheated floating water mist.

6. In combination, a greenhouse, means for discharging a liquid in the form of a fog-like mist therein, a source of liquid spray solution, a source of water and means for supplying said discharge means with said liquids either alone or in combination.

7. In combination, a greenhouse, an atomizer for discharging liquid into the greenhouse in the form of a fog-like mist, a pump adapted to pump liquid to said atomizer, means for supplying liquid insecticide to said pump, means for supplying water to said pump and control means for each of said supply means.

8. In combination, a greehouse, an atomizer for discharging liquid into the greenhouse in the form of a floating mist, means for supplying liquid under pressure to said atomizer, means for supplying said first named means with liquid insecticide, means for supplying said first named means with water, and means for regulating the supply of each of said liquids to said first named means.

9. In combination, a greenhouse, a pipe extending therein, an atomizer communicating with said pipe and means for supplying liquid to said pipe under pressure sufficient to atomize it into a fog-like mist.

10. In combination, a greenhouse, spray nozzles for spraying plants therein, inclined pipe means for supplying spray material to said spraying means, and means at the lower end of said pipe means for allowing spray material to drain therefrom to prevent dripping from the nozzles.

11. In combination, a greenhouse, and means for substantially filling said greenhouse with unheated mist of a fog-like nature.

12. In combination, a greenhouse, and means for alternately filling said greenhouse with an unheated fog-like mist of water and a fog-like mist of insecticide.

13. In combination, a greenhouse having plants therein, and means for enveloping substantially all of said plants in an unheated fog-like mist substantially simultaneously.

14. In combination, a greenhouse having plants therein, and means for alternately enveloping substantially all of said plants in a fog-like mist of water and a fog-like mist of insecticide.

15. In combination, a greenhouse having plants therein, and means for maintaining an enveloping unheated floating mist around substantially all of said plants simultaneously.

16. In combination, a greenhouse having plants therein, means for maintaining an enveloping fog-like mist of insecticide around substantially all of said plants simultaneously, and means for replacing said mist of insecticide with a fog-like water mist.

17. The method of treating plants in greenhouses and the like which comprises introducing a fog-like mist of liquid insecticide into the greenhouse, and thereafter introducing a fog-like mist of non-poisonous liquid into said greenhouse until the mist of insecticide is dispelled.

18. The method of treating plants in greenhouses and the like which comprises treating the plants with insecticide, and thereafter introducing a fog-like mist of non-poisonous liquid into said greenhouse until the insecticide fumes are dispelled.

19. The method of treating plants which comprises enveloping them in a fog-like mist of insecticide and thereafter enveloping them in a fog-like mist of non-poisonous liquid until the mist of insecticide is dispelled.

20. The method of treating plants in greenhouses and the like which comprises discharging into said greenhouse at a plurality of fixed locations an unheated liquid in the form of a mist whereby to substantially fill the greenhouse therewith.

21. The method of treating plants in greenhouses and the like which comprises discharging into said greenhouse along a circular path around each of a plurality of fixed locations, an unheated liquid in the form of a mist whereby to substantially fill the greenhouse therewith.

22. The method of treating plants in greenhouses and the like which comprises discharging into said greenhouse, along a circular path around each of a plurality of fixed locations, a liquid insecticide in the form of a mist, whereby to substantially fill the greenhouse therewith.

23. The method of cooling greenhouses or similar plant enclosures having plants therein, which comprises substantially filling said enclosure with a fog-like mist of cooling liquid.

24. The method of lowering the temperature in greenhouses and other plant enclosures, which comprises substantially filling said enclosure with a fog-like mist of a liquid containing sensible heat only.

25. The method of cooling greenhouses or similar plant enclosures having plants therein, which comprises substantially filling said enclosure with a fog-like mist of cooling liquid of sufficient fineness to lower the temperature while avoiding the accumulation of large drops of liquid on the plants.

26. In a method of treating plants in greenhouses and similar plant enclosures, the steps of introducing a finely divided fog-like mist of solution toxic to undesirable organisms into said greenhouse, and thereafter dissipating said fog-like mist by substantially filling said greenhouse with an aqueous non-toxic fog-like mist.

27. The method of treating plants in greenhouses and the like which comprises simultaneously introducing into said greenhouses, at a plurality of fixed locations, a liquid in the form of a fog-like mist whereby all portions of said greenhouse are substantially filled therewith.

28. In a method of treating and controlling the growth of plants in greenhouses and similar plant enclosures, the step of substantially filling said enclosure containing plants under treatment with a fog-like mist of a solution toxic to undesirable organisms.

Signed at San Jose, Calif., this 19 day June 1930.

HARRY C. LASSEN.
HENRY DAHL.